United States Patent [19]

Glugla

[11] 4,374,910

[45] Feb. 22, 1983

[54] ELECTROLYTE FOR SECONDARY ELECTROCHEMICAL CELL

[75] Inventor: Paul G. Glugla, Schenectady, N.Y.

[73] Assignee: General Electric Company, Schenectady, N.Y.

[21] Appl. No.: 304,494

[22] Filed: Sep. 22, 1981

[51] Int. Cl.³ .............................................. H01M 6/14
[52] U.S. Cl. .................................... 429/197; 429/199; 429/218
[58] Field of Search ................. 429/197, 199, 194, 218

[56] References Cited

U.S. PATENT DOCUMENTS

| | | | |
|---|---|---|---|
| 3,796,605 | 3/1974 | Dechenaux et al. | 429/197 |
| 4,118,550 | 10/1978 | Koch | 429/197 X |
| 4,248,946 | 2/1981 | Malachesky | 429/197 |

*Primary Examiner*—Anthony Skapars
*Attorney, Agent, or Firm*—Jane M. Binkowski; James C. Davis, Jr.; James Magee, Jr.

[57] ABSTRACT

An electrolyte solution consisting essentially of 2-methoxyethanol in an amount of at least about 0.5% by weight of a solution of 2-methyltetrahydrofuran and a lithium salt is used as an electrolyte in a secondary electrochemical cell wherein the active material of one of the electrodes is lithium metal.

10 Claims, 1 Drawing Figure

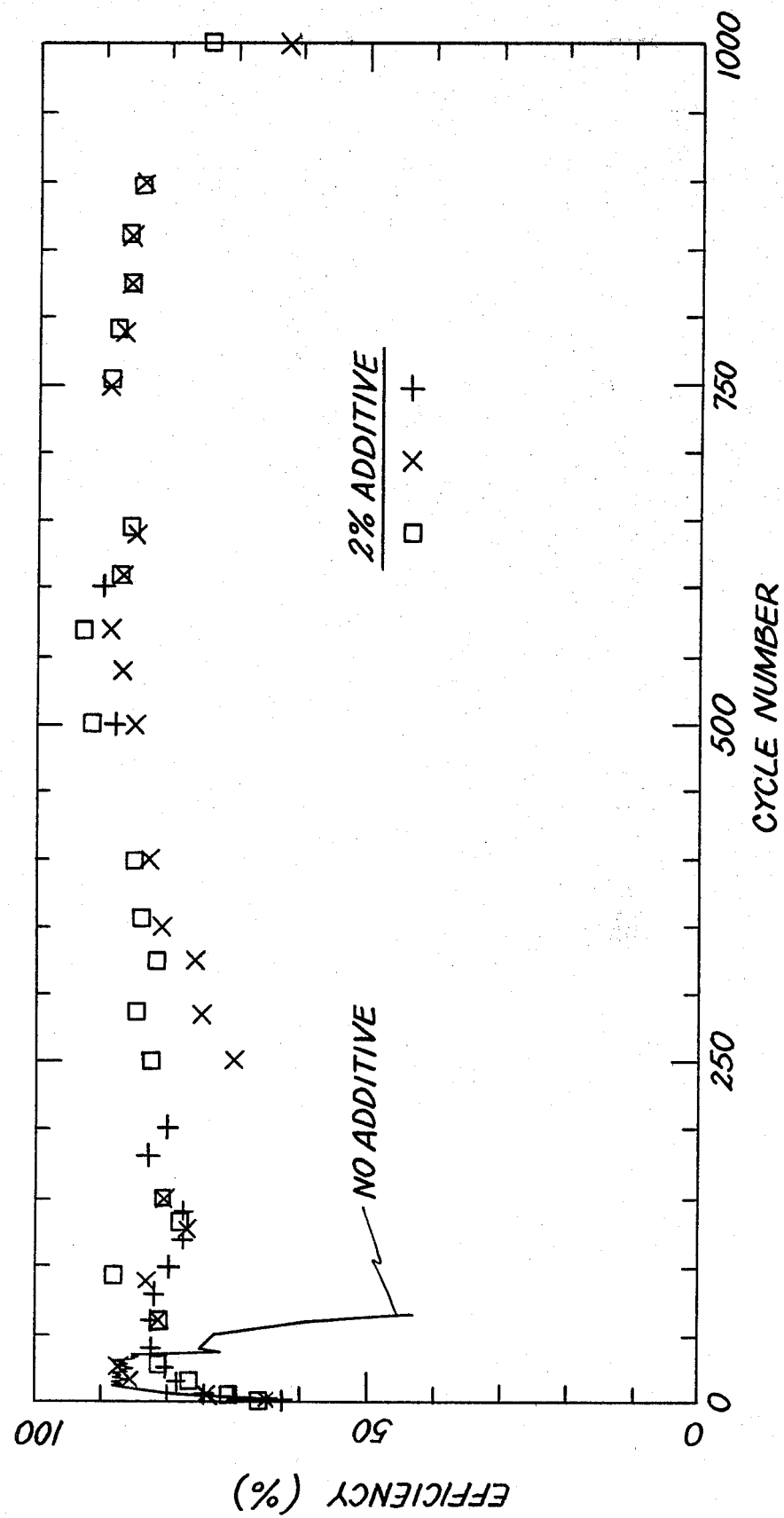

ELECTROLYTE FOR SECONDARY ELECTROCHEMICAL CELL

This invention relates to an improved electrolyte for use with a lithium electrode in a secondary electrochemical cell.

The lithium electrode is the major source of inefficiency in many of the proposed lithium secondary battery systems, i.e. rechargable systems. U.S. Pat. No. 4,118,550 to Koch discloses electrolytes comprised of a lithium salt and selected alkylated analogs of tetrahydrofuran and tetrahydropyran. Specifically, this Koch patent discloses an electrolyte for use in an electrochemical cell having a lithium negative electrode wherein the electrolyte comprises an ionically dissociable solute in the form of a lithium salt and a solvent for said salt which comprises predominantly one or more members from the class consisting of compounds conforming to the formula

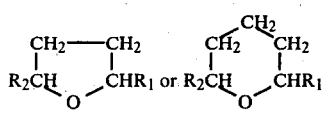

where $R_1$ and $R_2$ are both alkyl groups or one of them is an alkyl group and the other is hydrogen, said alkyl group being a methyl, ethyl, propyl, isopropyl, butyl, isobutyl or tertiary butyl group.

The present invention utilizes an additive, 2-methoxyethanol, to produce an improved electrolyte for the lithium electrode. Specifically, the present electrolyte extends the life of the lithium electrode significantly, usually at least ten fold, without degrading cycling efficiency.

Briefly stated, the present invention is directed to a secondary electrochemical cell wherein the active material of one of the electrodes is lithium metal, the improvement comprising an electrolyte consisting essentially of 2-methoxyethanol and a solution composed of one or more solvents selected from the group which has the formula:

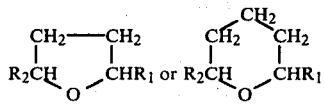

where $R_1$ and $R_2$ are both methyl groups or one of them is a methyl group and the other is hydrogen, and an ionically dissociable lithium salt, said 2-methoxyethanol ranging in amount from about 0.5% by weight of said solution to an amount wherein the resulting electrolyte does not exhibit a significant rate of gas evolution.

Those skilled in the art will gain a further and better understanding of the present invention from the detailed description set forth below considered in conjunction with the accompanying FIGURE forming a part of the specification which compares the cycling efficiency of the present electrolyte solution containing 2% by weight of 2-methoxyethanol with an electrolyte solution which did not contain 2-methoxyethanol but which otherwise was of the same composition.

In the present secondary electrochemical cell, the active material of one of the electrodes is lithium metal. The lithium metal can be used alone, or it can be supported on a suitable substrate such as nickel or aluminum.

Broadly, the counter electrode of the present invention is a depolarizer reducible by lithium metal. It is apparent that in selecting a counter electrode, considerations of corrosiveness, and pressure and temperature requirements must be compatible with the physical properties of the lithium electrode and the present electrolyte solution, i.e. the counter electrode should have no significant deleterious effect on the lithium electrode or the present electrolyte solution. Suitable examples of a useful depolarizer for the present counter electrode include the transition metal sulfides ($TiS_2$, $TaS_2$, $Cr_xV_{1-x}S_2$ where $x=0$ to 1), transition metal oxides ($V_6O_{13}$, $TiO_2$) or the halogens with $\beta$-alumina separators ($\beta$-alumina separator and $Br_2$, $\beta$-alumina separator and $I_2$). Of these counter electrodes, the preferred choice is $TiS_2$.

The present electrolyte solvent is selected from the group consisting of certain analogs of tetrahydrofuran and tetrahydropyran. Specifically, these solvents are selected from the group having the following formula:

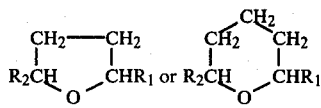

where $R_1$ and $R_2$ are both methyl groups or one of them is a methyl group and the other is hydrogen. As a practical matter, these solvents with an alkyl group longer than a methyl group are not useful in the present invention because they do not sufficiently ionically dissociate the lithium salt. Preferably, the solvent is 2-methyltetrahydrofuran.

The lithium salt or lithium salt mixture used in forming the present electrolyte solution is an ionizing solute which will produce an ionically conductive electrolyte solution having a useful specific conductivity at room temperature, i.e., a solution having a specific conductivity at 25° C. of at least about $10^{-5}$ ohm$^{-1}$ cm$^{-1}$. The concentration of the lithium salt in the present electrolyte solution at room temperature ranges from a minimum at which the electrolyte solution has a useful specific conductivity and can be increased up to a point at which it has no significant deleterious effect on the electrolyte solution. Preferably, in the present invention, the concentration of the lithium salt in the electrolyte solvent ranges from about 0.1 Molar to about its solubility limit which is about 2.5 Molar (0.1 mole to about 2.5 moles lithium salt per liter of lithium-salt-electrolyte solvent solution at 20° C.), with the particular amount of lithium salt depending largely on the rate of charge desired. Preferably, 0.5 Molar lithium salt in 2-methyltetrahydrofuran is used, and preferably the salt is $LiAsF_6$. The lithium salt should be soluble in the electrolyte solvent at room temperature and should have no significant deleterious effect on the electrolyte solvent, or the 2-methoxyethanol or the electrodes.

Representative of the lithium salts useful in the present invention are lithium perchlorate ($LiClO_4$), lithium bromide (LiBr), lithium iodide (LiI), lithium aluminum tetrachloride ($LiAlCl_4$), lithium tetrafluoroborate ($LiBF_4$), lithium hexafluoroarsenate ($LiAsF_6$), lithium hexafluorophosphate ($LiPF_6$), lithium tetramethyl borate ($LiB(CH_3)_4$), lithium methyl sulfonate (Li- OSO₂CH₃), and lithium oxide aluminum chloride complex salt (Li₂O.2AlCl₃).

2-Methoxyethanol has the following formula:

$$H_3C-O-CH_2-CH_2-OH$$

The 2-methoxyethanol is used in an amount ranging from about 0.5 part per 100 parts of the solution composed of the present electrolyte solvent and lithium salt, i.e. from about 0.5% by weight of the solution of the present electrolyte solvent and lithium salt. The maximum amount of 2-methoxyethanol is that amount which does not produce a significant rate of gas evolution in the resulting electrolyte, i.e. an excess amount of 2-methoxyethanol produces a gas-forming reaction. Generally, the maximum amount of 2-methoxyethanol is about 7% by weight of the solution composed of electrolyte solvent and lithium salt. The specific amount of 2-methoxyethanol is determinable empirically and depends largely on the component materials of the particular system, particularly on the specific lithium salt or lithium salt mixture used, but an amount of 2-methoxyethanol of about 2.0% by weight of the lithium salt-electrolyte solvent solution is preferred since it has shown optimum cycling behavior. Amounts of 2-methoxyethanol outside the present range are not effective to increase the cycle life of the lithium electrode significantly.

The invention is further illustrated in the following examples:

EXAMPLE 1

A plate-strip experiment was developed to evaluate the cycling ability of various electrolyte solutions.

The cell system was comprised of a working electrode consisting of nickel on which lithium was to be plated, a counter electrode of lithium metal which provided an infinite source of lithium ions and a reference electrode of lithium metal which was used to measure voltage of the working electrode. All three electrodes were immersed in a common electrolyte.

This plate-strip experiment was chosen as a diagnostic test and was not meant to be the optimum procedure for cycling lithium efficiently. A cycle consisted of a galvanostatic plating of lithium on the nickel working electrode at 1.5 ma/cm² for 20 minutes followed by a potentiostatic stripping of the nickel electrode at ~70 mV in reference to the lithium reference electrode. 70 mV was chosen as a control voltage because it produces a current of less than 1.5 mA/cm² on the nickel electrode in the test cell. The efficiency of a cycle was computed by comparing the coulombs used in the stripping operation to the coulombs used in the plating process. All of the experiments were carried out at room temperature under argon containing less than 10 ppm water and less than 5 ppm oxygen.

These experiments are illustrated in the accompanying FIGURE where cycling efficiency is plotted against cycle number.

In a first experiment, the cycling procedure was applied to a cell wherein the electrolyte solution was composed of 0.5 mole/liter of LiAsF₆ in 2-methyltetrahydrofuran, and 35 cycles above 85% efficiency were attained before failure. This experiment is illustrated in the FIGURE by the solid line labelled No Additive which represents the cycling efficiency for every cycle observed, and which is shown as a solid line to avoid visual complexities.

In each of second, third and fourth experiments, which were carried out at different times, the cycling procedure was applied to a cell wherein the electrolyte solution was composed of 2-methoxyethanol in an amount of 2.0 parts per 100 parts of a solution of 0.5 mole/liter of LiAsF₆ in 2-methyltetrahydrofuran. In each of these second, third and fourth experiments, more than 300 cycles were completed above 85% efficiency before failure. These experiments are plotted in the FIGURE where they are labelled 2% additive and illustrate the present invention. Specifically, in each of these second, third and fourth experiments, each point in the FIGURE represents the average of 10 cycles chosen at various intervals throughout the experiments. As illustrated by the FIGURE, the experiments which illustrate the present invention, i.e. those utilizing the present electrolyte containing 2% by weight 2-methoxyethanol, show a substantially improved performance over the electrolyte which does not contain 2-methoxyethanol. Specifically, the FIGURE shows that the lithium electrode is stabilized in the present electrolyte with respect to time.

What is claimed is:

1. In a secondary electrochemical cell wherein the active material of one of the electrodes is lithium metal, the improvement comprising an electrolyte consisting essentially of 2-methoxyethanol and a solution composed of one or more solvents selected from the group which has the formula:

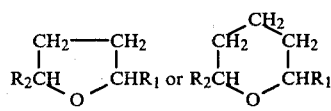

where R₁ and R₂ are both methyl groups or one of them is a methyl group and the other is hydrogen and an ionically dissociable lithium salt, said 2-methoxyethanol ranging in amount from about 0.5% by weight of said solution to an amount wherein the resulting electrolyte does not exhibit a significant rate of gas evolution.

2. The secondary cell according to claim 1 wherein said solvent is 2-methyltetrahydrofuran.

3. The secondary cell according to claim 1 wherein said maximum amount of said 2-methoxyethanol is about 7% by weight of said solution.

4. The secondary cell according to claim 3 wherein said 2-methoxyethanol is present in an amount of about 2% by weight of said solution.

5. The secondary cell according to claim 1 wherein the concentration of said lithium salt ranges from about 0.1 mole to about 2.5 mole per liter of said solution.

6. The secondary electrochemical cell according to claim 5 wherein said concentration of said lithium salt is about 0.5 mole per liter of said solution.

7. The secondary electrochemical cell according to claim 1 wherein said lithium salt is selected from the group consisting of lithium iodide, lithium bromide, lithium perchlorate, lithium aluminum tetrachloride, lithium tetrafluoroborate, lithium hexafluoroarsenate, lithium hexafluorophosphate, lithium tetramethyl borate, lithium methyl sulfonate and lithium oxide aluminum chloride complex salt.

8. The secondary electrochemical cell according to claim 7 wherein said lithium salt is lithium hexafluoroarsenate.

9. In a secondary electrochemical cell wherein the active material of one of the electrodes is lithium metal, the improvement comprising an electrolyte solution consisting essentially of 2-methoxyethanol in an amount of about 2% by weight of a solution composed of 2-methyltetrahydrofuran and lithium hexafluoroarsenate.

10. The secondary electrochemical cell according to claim 9 wherein said lithium hexafluoroarsenate is present in an amount of about 0.5 mole per liter of said solution composed of 2-methyltetrahydrofuran and lithium hexafluoroarsenate.

* * * * *